(12) United States Patent
Rogers et al.

(10) Patent No.: US 8,021,086 B2
(45) Date of Patent: Sep. 20, 2011

(54) DRILLING APPARATUS AND METHOD

(75) Inventors: Travis A. Rogers, Pearcy, AR (US);
Forney B. Lile, Benton, AR (US)

(73) Assignee: Controlled Automation, Incorporated, Bauxite, AR (US)

( * ) Notice: Subject to any disclaimer, the term of this patent is extended or adjusted under 35 U.S.C. 154(b) by 1191 days.

(21) Appl. No.: 11/729,297

(22) Filed: Mar. 28, 2007

(65) Prior Publication Data

US 2008/0240878 A1 Oct. 2, 2008

(51) Int. Cl.
*B23B 39/16* (2006.01)
(52) U.S. Cl. ............... 408/1 R; 408/2; 408/13; 408/42; 408/108; 408/131; 408/237; 33/638; 33/645
(58) Field of Classification Search .............. 408/1 A, 408/2, 13, 42, 108, 129, 130, 131, 237; 33/638, 33/645; *B23B 39/16*
See application file for complete search history.

(56) References Cited

U.S. PATENT DOCUMENTS

| | | | |
|---|---|---|---|
| 3,090,261 A | 5/1963 | Hill | |
| 3,253,484 A | 5/1966 | Hill | |
| 3,730,635 A * | 5/1973 | Orendi | 408/46 |
| 3,957,140 A | 5/1976 | Overkott | |
| 3,974,726 A | 8/1976 | Stursberg | |
| 3,980,506 A | 9/1976 | Overkott | |
| 3,996,830 A | 12/1976 | Peddinghaus et al. | |
| 4,008,885 A | 2/1977 | Einhaus | |
| 4,012,977 A | 3/1977 | Regenbrecht | |
| 4,033,571 A | 7/1977 | Wepner | |
| 4,061,064 A | 12/1977 | Kindgren et al. | |
| 4,067,252 A | 1/1978 | Peddinghaus et al. | |
| 4,085,925 A | 4/1978 | Peddinghaus et al. | |
| 4,102,228 A | 7/1978 | Peddinghaus et al. | |
| 4,108,564 A | 8/1978 | Peddinghaus et al. | |
| 4,158,761 A | 6/1979 | Wittenstein | |
| 4,171,735 A | 10/1979 | Zuhlke et al. | |
| 4,179,229 A | 12/1979 | Kitagawa | |
| 4,179,230 A | 12/1979 | Kitagawa | |
| 4,198,181 A | 4/1980 | Smelser | |
| 4,238,718 A | 12/1980 | Wepner et al. | |
| 4,245,144 A | 1/1981 | Wittenstein et al. | |
| 4,268,195 A | 5/1981 | Regenbrecht | |
| 4,289,054 A | 9/1981 | Pieper et al. | |
| 4,319,504 A | 3/1982 | Wepner et al. | |

(Continued)

FOREIGN PATENT DOCUMENTS

JP 02243249 A * 9/1990

*Primary Examiner* — Eric A Gates
(74) *Attorney, Agent, or Firm* — Speed Law Firm

(57) ABSTRACT

Embodiments include a method and apparatus for drilling holes or cutting at specified locations on a beam or other material, even if the beam is offset from an ideal beam configuration. In some embodiments, the apparatus is configured to determine the correct locations of holes in the beam despite the beam's offset and drill holes in the beam according to this determination. The apparatus may be capable of drilling holes at specified locations on a web of an I-beam. In some embodiments, the method comprises determining the correct locations of the holes in the particular beam using the apparatus and drilling the holes in the correct locations in the beam according to that determination. Some embodiments include using one or more clamping mechanisms and one or more drilling members to determine the correct locations of the holes in the particular beam.

19 Claims, 6 Drawing Sheets

U.S. PATENT DOCUMENTS

| | | | |
|---|---|---|---|
| 4,338,838 A | 7/1982 | Stursberg et al. | |
| 4,339,972 A | 7/1982 | Wepner et al. | |
| 4,379,417 A | 4/1983 | Pieper et al. | |
| 4,383,430 A | 5/1983 | Klaus | |
| 4,440,292 A | 4/1984 | Regenbrecht | |
| 4,457,197 A | 7/1984 | Wepner et al. | |
| 4,479,375 A | 10/1984 | Klaus et al. | |
| 4,531,983 A | 7/1985 | Overkott | |
| 4,625,855 A | 12/1986 | Klaus | |
| 4,631,996 A | 12/1986 | Magnuson | |
| 4,635,512 A | 1/1987 | Wengenroth | |
| 4,639,878 A | 1/1987 | Day et al. | |
| 4,644,836 A | 2/1987 | Wepner et al. | |
| 4,662,612 A | 5/1987 | Magnuson | |
| 4,688,456 A | 8/1987 | Stursberg | |
| 4,712,953 A * | 12/1987 | Witzel et al. | 409/131 |
| 4,715,774 A | 12/1987 | Magnuson | |
| 4,911,049 A | 3/1990 | Stursberg | |
| 4,922,744 A | 5/1990 | Stursberg | |
| 4,932,300 A | 6/1990 | Bauer | |
| 4,940,216 A | 7/1990 | Stursberg et al. | |
| 4,945,752 A | 8/1990 | Stursberg et al. | |
| 4,995,599 A | 2/1991 | Pfluger | |
| 5,018,911 A | 5/1991 | Stursberg | |
| 5,063,804 A | 11/1991 | Magnuson | |
| 5,156,077 A | 10/1992 | Stursberg | |
| 5,161,298 A | 11/1992 | Stursberg | |
| 5,184,532 A | 2/1993 | Wengenroth | |
| 5,203,198 A | 4/1993 | Stursberg | |
| 5,235,884 A | 8/1993 | Magnuson | |
| 5,256,212 A | 10/1993 | Magnuson | |
| 5,368,538 A | 11/1994 | Peddinghaus et al. | |
| 5,394,782 A | 3/1995 | Magnuson et al. | |
| 5,575,186 A | 11/1996 | Kempen | |
| 5,778,744 A * | 7/1998 | Braun et al. | 82/1.11 |
| 5,787,566 A | 8/1998 | Stursberg et al. | |
| 5,868,409 A | 2/1999 | Breuer et al. | |
| 5,882,585 A | 3/1999 | Wegner et al. | |
| 6,094,793 A | 8/2000 | Szuba | |
| 6,327,761 B1 | 12/2001 | Magnuson | |
| 6,345,939 B1 | 2/2002 | Poeting | |
| 6,419,426 B1 | 7/2002 | Chalupa et al. | |
| 6,739,228 B1 | 5/2004 | Magnuson | |
| 7,259,872 B2 | 8/2007 | Mullikin | |
| 7,974,719 B2 | 7/2011 | Tebboune et al. | |
| 2004/0261908 A1 | 12/2004 | Wolven | |
| 2006/0289758 A1 | 12/2006 | Colombo et al. | |

* cited by examiner

DRILLING APPARATUS AND METHOD

BACKGROUND OF THE INVENTION

1. Field of the Invention

Embodiments generally relate to a drilling or cutting apparatus and method. More specifically, embodiments relate to an apparatus or machine (e.g., a drilling or cutting machine) and method for performing an operation on (e.g., forming one or more holes in or cutting) a material such as a beam.

2. Description of the Related Art

Preparing beams for use in various applications, such as for structural use in buildings, often involves drilling holes in various locations on the beam according to specifications. Drilling machines are typically used to drill the holes at the specified locations on the beam.

Various beams, such as I-beams, routinely are not ideally shaped and include some variation in shape from beam to beam, for example beam width varies and the flanges are not always vertically disposed with respect to the web. FIGS. 1A-E show some exemplary I-beams, including offset or skewed configurations of I-beams. The typical drilling machine is not configured to take into account these offsets, skews, or variations in shape of the beams, causing the drilling machine to drill holes in the wrong locations on the beam. The currently utilized drilling machine drills the holes where the ideal beam's holes should be located rather than where the holes should be disposed in the actual beam (which may be offset or skewed in comparison to the ideal beam). The desired locations of the holes of the I-beam are determined by the application, for example when I-beams are intended for use in the construction of a structure such as a building. Generally, the strength of the beam is based on the distance of the holes from the center of the web, making accurate placement of web holes of paramount concern in various beam applications.

Preparing beams for use in applications also may involve cutting portions of the beam, such as the beam flanges, using a machine or apparatus. Again, the flanges are often not disposed with respect to the web as needed and the flanges may not be even with respect to one another (they may be offset from one another) or vertical with respect to the web. A cutting machine which is capable of determining the offset of the flanges relative to one another and cutting the flanges accordingly is not available in the prior art and is needed. Therefore, there is a need for a drilling machine utilized in performing operations on a beam (e.g., forming beam holes) which is capable of determining the variation in shape, offset, or skew of a beam. There is a further need for a drilling machine which is capable of drilling holes in the correct locations in a beam despite the skew or offset of a beam. There is yet a further need for an apparatus which is capable of determining variation in shape, skew, or offset of a beam and drilling the holes in the correct locations in the beam according to that determination. There is also a need for a drilling machine which is capable of receiving multiple beams of various shapes, skews, and offsets and drilling holes in the beams despite the different shapes, skews, and offsets of these beams.

SUMMARY OF THE INVENTION

It is therefore an object of embodiments to provide a drilling machine utilized in forming holes in beams which is capable of determining the variation in shape, offset, or skew of a beam.

It is a further object of embodiments to provide a drilling machine which is capable of drilling holes in the correct locations in a beam despite the skew or offset of a beam.

It is yet a further object of embodiments to provide an apparatus which is capable of determining variation in shape, skew, or offset of a beam and drilling the holes in the correct locations in the beam according to that determination.

An even further object of embodiments is to provide a drilling machine which is capable of receiving multiple beams of various shapes, skews, and offsets and drilling holes in the beams despite the different shapes, skews, and offsets of these beams.

It is another object of embodiments to provide a cutting machine which is capable of determining the skew or offset of flanges of a material such as a beam.

It is a further object of embodiments to provide a cutting machine which is capable of determining the skew or offset of flanges of a material such as a beam and cutting the flanges taking into account their skew or offset.

In accordance with these and further objects, embodiments generally include a drilling apparatus capable of drilling one or more holes in a beam, comprising one or more clamping mechanisms capable of clamping the beam therein to determine reference material dimensions; one or more drilling members for providing one or more position readings on the beam for use in determining beam skew relative to the reference material dimensions, the one or more drilling members capable of translating relative to the beam; and a controller operatively connected to the one or more clamping mechanisms and the one or more drilling members, wherein the one or more position readings of the one or more drilling members are communicated to the controller upon contact of the one or more drilling members with the beam and the controller uses these one or more position readings to calculate actual material dimensions including beam skew. Further embodiments include a drilling apparatus for drilling one or more holes in a web of an I-beam, comprising one or more clamping mechanisms capable of clamping the I-beam therein to determine reference beam dimensions; a first drilling member for contacting a first flange of the I-beam in at least two locations; a second drilling member contacting a second flange of the I-beam in at least two locations; one or more servo motors and one or more encoders, resolvers, or hall effect devices operatively connected to each drilling member for providing position readings at the locations where the drilling members contact the first and second flanges to determine beam skew; and one or more counting mechanisms operatively connected to the one or more encoders, resolvers, or hall effect devices for relaying position readings to a controller, the controller capable of receiving position readings data and calculating true beam dimensions and a distance from a center of each flange from a side clamp surface.

Yet further embodiments include a method of determining proper positioning for one or more holes in a beam, comprising providing a drilling apparatus comprising one or more clamping mechanisms and one or more drilling members capable of operable communication with a controller; clamping the beam within the one or more clamping mechanisms; determining reference material dimensions of the beam using the one or more clamping mechanisms and the controller; using the drilling members to make one or more position readings of the drilling members upon their contact with the beam; communicating the one or more position readings and the reference material dimensions to the controller; and calculating actual material dimensions and material skew using the one or more position readings and the reference material dimensions.

Other embodiments include a cutting apparatus capable of cutting one or more flanges of a beam, comprising one or more clamping mechanisms capable of clamping the beam therein to determine reference material dimensions; one or more cutting members for providing one or more position readings on the beam for use in determining beam skew relative to the reference material dimensions, the one or more cutting members capable of translating relative to the beam; and a controller operatively connected to the one or more clamping mechanisms and the one or more cutting members, wherein the one or more position readings of the one or more cutting members are communicated to the controller upon contact of the one or more cutting members with the beam and the controller uses these one or more position readings to calculate actual material dimensions including beam skew.

BRIEF DESCRIPTION OF THE DRAWINGS

So that the manner in which the above-recited features of embodiments may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
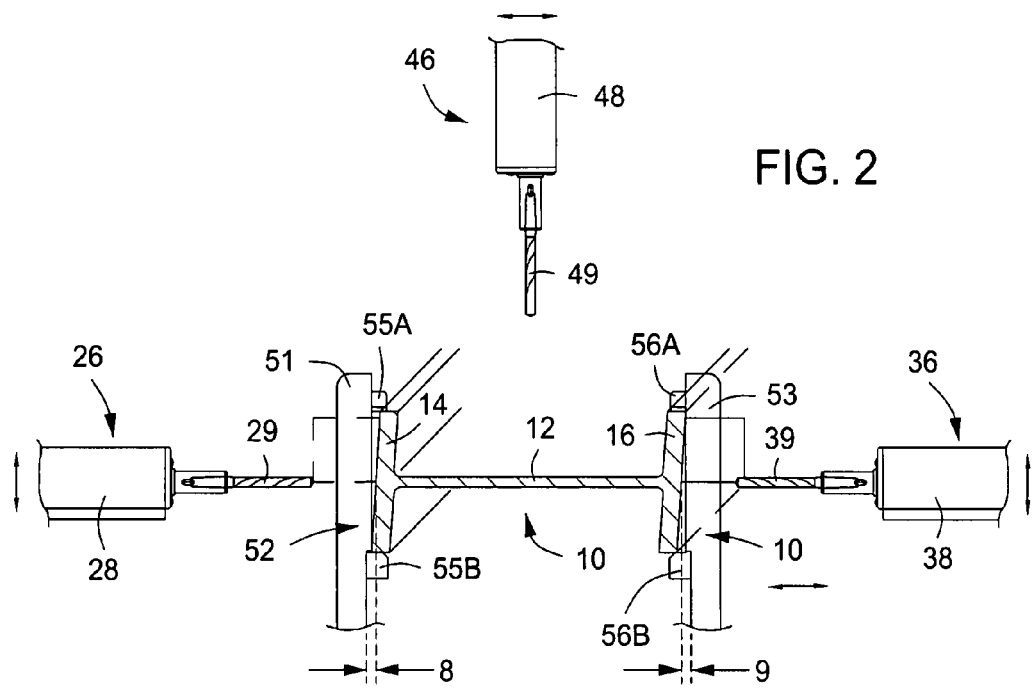
FIG. 2 is a sectional view of a drilling apparatus with an I-beam therein.
Figure 1A:
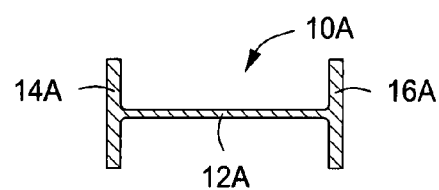
FIGS. 1A-1E are cross-sectional views of various configurations of an I-beam.
Figure 1B:
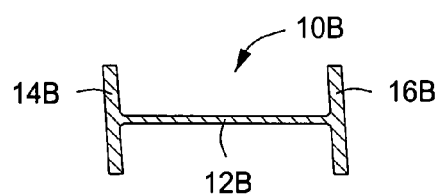
Figure 1C:
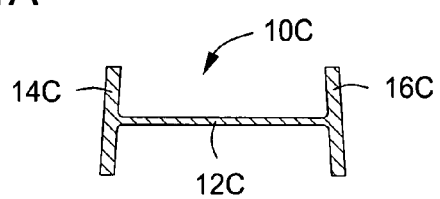
Figure 1D:
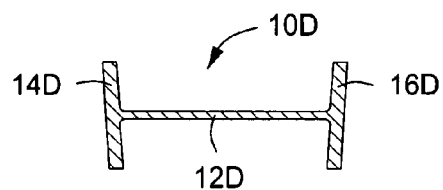
Figure 1E:
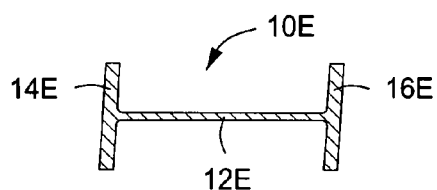

Embodiments include an apparatus including a tool and clamping system with measuring ability, where the tool finds the material using the tool and clamping system with measuring ability without the need to know the tool length. In some embodiments, the apparatus is a drilling apparatus, the tool is one or more drills or drilling members, and there is no need to know the bit length to determine proper drilling position of the hole(s). The other embodiments, the apparatus is a cutting apparatus such as a plasma cutter or an oxy cutter, and the tool may instead be one or more cutting tools such as plasma torches or oxy torches.

Although the following description refers to forming one or more holes in an I-beam, the drilling apparatus 20 is equally applicable to forming one or more holes in other beams and other materials (e.g., channels, angles, tubing, or flat bar materials). Some typical I-beam configurations are shown in FIG. 1. An I-beam is generally designated by the numeral 10, and numerals 10A-E designate some configurations of the I-beam. An ideal I-beam is designated by number 10A, while multiple offset or skewed configurations of the I-beam are designated by numbers 10B-E. Regardless of the configuration of the I-beam 10 (and 10A-E), it includes a web 12 (and 12A-E) having a first flange 14 (and 14A-E) at or near a first end of the web 12 and a second flange 16 (and 16A-E) at or near a second end of the web 12. The first flange 14 may be a top flange, while the second flange 16 may be a bottom flange.

I-beams are typically not rolled to exact specifications, as the width of the beams often varies and the flanges are not always vertically disposed with respect to the web (the same is true for other types of beams, angles, channels, and tubing). When the configurations of the I-beam 10 vary in shape as shown in FIG. 1 (which variation is practically inevitable because of the inability to roll every I-beam to its ideal shape 10A), the typical drilling machine is unable to determine where the holes should properly be located in each I-beam 10 (e.g., with respect to an end of the web or with respect to a center of the web) which enters the machine and therefore is unable to place holes in the proper locations. A drilling apparatus 20 is shown in FIGS. 2-6 which is capable of determining the offset, skew, or variation in shape of an I-beam 10, determining the proper position of one or more holes in the skewed, offset, or varied I-beam 10, and forming the one or more holes in the I-beam where the one or more holes are located in their proper positions (e.g., with respect to a web end or web center).

The drilling apparatus 20, which is illustrated in FIGS. 2-6, includes a frame 22 having a operating space 24 therein through which the I-beam 10 may travel via a conveyor (not shown) or other device capable of moving the I-beam 10 through the space 24 and within which the operation may be performed on (e.g., one or more holes may be formed in) the I-beam 10 (hole(s) may be formed in the web 12 and/or one or both of the flanges of the I-beam 10). The drilling apparatus 20 constitutes controlled and automated equipment which is capable of determining the offset or skew of I-beams 10 or other materials capable of having distorted shapes or configurations and of forming holes in the correct locations on the I-beam 10 despite its distorted shape.

A controller 80, which may be a computer as known to those skilled in the art, may be in communication with the drilling apparatus 20 (e.g., via the servo drive(s) and/or counter(s), as described below). The controller 80 may be electrically connectable to the drilling apparatus 20, for example via a conductor 82 such as an electrical wire, or it may be capable of wireless communication with the drilling apparatus 20. The controller 80 includes, for example, one or more computers. The controller 80 may include or be compatible with software (or may include hardware) or other informational data which is capable of providing and/or performing calculations and/or algorithms (see example calculations which may be performed by the programmed controller or its external device(s)/software/program(s) using the parameters gathered with the drilling apparatus 20) to determine the skew, offset, or shape variation of the beam 10 from the gathered parameters (described below), capable of manipulating portions of the drilling apparatus 20 to obtain those parameters, and may be capable of manipulating components of the drilling apparatus 20 to drill holes at the calculated locations in the material or beam 10. The controller 80 may further include a display such as a screen for viewing information data.

The drilling apparatus 20 also includes at least one drilling member and may include a plurality of drilling members for forming one or more holes in a beam such as an I-beam. In the embodiment of the drilling apparatus 20 shown in FIGS. 2-6, a first drilling member 26, second drilling member 36, and third drilling member 46 are operably connected to the drilling apparatus 20. Each drilling member 26, 36, 46 may be operably disposed within a drill frame 27, 37, 47, respectively, and may be operably connected to the drilling apparatus frame 22 via its drill frame 27, 37, 47. Each drilling member 26, 36, 46 may include a spindle 28, 38, 48 (see FIG. 2), respectively, and a drill bit 29, 39, 49 (see FIG. 2), respectively, where the drill bit 29, 39, 49 is capable of rotation relative to the spindle 28, 38, 48 to form one or more holes in the I-beam 10. The drilling member 26 may be employed to probe the first flange 14 and drill one or more holes in the first flange 14, the drilling member 36 may be employed to probe the second flange 16 and drill one or more holes in the second flange 16, and the drilling member 46 may be employed to drill one or more holes in the web 12 (and may optionally also probe the web 12).

The drilling members 26, 36, 46 may be capable of movement along both the x-axis and y-axis (but it is contemplated by the inventor that in other embodiments, the drilling members 26, 36, 46 may be moveable only along the x-axis or y-axis, or may instead by moveable along all of the x, y, and z axes). This ability for the drilling members 26, 36, 46 to move along the x and y axes may be provided by the drill frames 27, 37, 47 being moveable along the adjacent portion of the drilling apparatus frame 22, for example via carriages (not shown). The drill frames 27, 37, 47 may operate independently of one another.

Each drilling member 26, 36, 46 may be equipped with a servo motor 30, 40, 50 or other drive mechanism (e.g., non-servo motor, DC motor, hydraulics, etc., or a combination of any or all of these), respectively, having one or more counting mechanisms operatively connected thereto. Each servo motor turns the one or more counting mechanisms, and the controller 80 reads the one or more counting mechanisms to relate position to the controller 80. The servo motors 30, 40, 50 are capable of communication with their respective drilling members 26, 36, 46 to feed the drilling members 26, 36, 46. The counting mechanism(s) may be in communication with the controller 80 (e.g., via the conductor 82) to relay information, such as drilling member position information, between and among the drilling members 26, 36, 46 and the controller 80 (described in more detail below in the operation description). The drilling members 26, 36, 46 with their drive mechanisms and counting mechanisms may possess measuring ability with respect to parameters of the I-beam 10 (e.g., material or beam skew, offset, or shape variation with respect to a reference material or beam width), along with their ability to form holes in the I-beam 10.

For each drilling member 26, 36, 46, one or more operatively connected drive mechanisms (e.g., non-servo motor, DC motor, hydraulics, etc., or a combination of any or all of these) produce linear movement of the tool (e.g., the drilling members 26, 36, 46) towards the material/beam 10, thus feeding the tool. Also, one or more counting systems/mechanisms are operatively connected (e.g., via the one or more drive mechanisms such as the servo motors) to each drilling member 26, 36, 46 to relate (e.g., to the controller) the position of the tool (e.g., drilling member 26, 36, 46) at any point in time.

The drive mechanism(s) may include one or more servo motors 30, 40, 50 operatively connected to a lead screw or other mechanism for converting rotational force to linear force. Each servo motor 30, 40, 50 is a motor which turns to produce rotational force. The motor may be operatively connected to a lead screw which rotates to feed the drilling member 26, 36, 46 towards the material/beam 10 so that the rotational force is converted to a linear force.

In some embodiments, each servo motor 30, 40, 50 possesses a drive which monitors the position of the motor shaft through an encoder, resolver, hall effect device, or other position-monitoring device known to those skilled in the art. The servo drive monitors the speed command given by the controller 80 (e.g., the computer) and changes its output to the motor (voltage and current) to make the servo motor produce that exact speed as commanded by the controller 80.

In alternate embodiments, the drive mechanism(s) may include hydraulics to create linear motion of the tool (drilling members 26, 36, 46) directly in lieu of the servo motor 30, 40, 50 and the lead screw or other rotational to linear force converter. The hydraulic drive mechanism(s) includes one or more servo or proportional valves, one or ore hydraulic cylinders, one or more pumps, and one or more motors for driving the pump(s). The one or more hydraulic cylinders create linear motion directly. When using hydraulics for the drive mechanism(s), one or more counting mechanisms are operatively connected to the drive mechanism(s). The hydraulics may include one or more hydraulic motors instead of the hydraulic cylinder with all of the other hydraulic drive mechanism(s) components described in this paragraph.

When one or more encoders are utilized with the servo drive, the one or more encoders each produce pulses which are accumulated in a counter (which may be any counting mechanism known to those skilled in the art). The counter is read by the controller 80 (e.g., the computer) to determine the position (e.g., of the motor shaft). When a resolver is utilized in lieu of or in addition to the encoder, the resolver produces an output that is convertible to counts as well.

The controller 80 (e.g., computer) may be operatively connected (e.g., electrically connected) to one or more counting devices/mechanisms on the drilling machine which relate position to the controller 80. In some embodiments, the one or more counting devices/mechanisms may include one or more rotary encoders driven by one or more rack and pinions, one or more rotary encoders operatively connected to one or more lead screws that are rotated by one or more service motors, and/or one or more encoders operatively connected to one or more motor shafts that rotate when the one or more servo motors rotate. In other embodiments, the one or more counting devices/mechanisms include a resolver. In yet other embodiments, the computer/controller 80 may be operatively connected to an encoder output that the drive produces based on the connection of the drive to the servo motor and how the drive knows where the motor shaft is located. The computer/controller 80 is capable of reading the counter(s) that accumulate the pulses from the encoders or resolvers.

The drilling members 26, 36, 46 may feed (linear movement of the tool toward the beam) with one or more servo motors, non-servo motors, hydraulics, or any other apparatus capable of producing linear movement of a tool known to those skilled in the art, or a combination of any or all of the above. When the drill bit 29, 39, 49 contacts the material could be determined in many different ways, including but not limited to by different digital filters, electrical contacts, limit switches, or a combination of any or all of the above. In sum, the controller 80 determines the skew, while the counting devices accumulate the pulses from the pulse producing devices, which may include one or more of the following: servo drive, encoder, revolver, or any other pulse producing device known to those skilled in the art. The controller 80 reads the counter(s) that accumulate the pulses from the encoder(s) (or other pulse producing device(s)). The controller 80 reads one or more counters that the servo motor(s) in some way turns, and the controller 80 also communicates with the servo drive(s).

The drilling apparatus 20 further includes one or more clamping mechanisms (or clamping members), preferably two clamping mechanisms 52 and 54 capable of holding a beam or other material (such as the I-beam 10) within the drilling apparatus 20 during drilling and measuring. One or more of the clamping mechanisms 52, 54 may be capable of translation along the x-axis (and may also be capable of translation along the y-axis and/or z-axis) to securely hold the I-beam 10 or other material within the drilling apparatus 20, and one or more of the clamping mechanisms 52, 54 may move inward and outward relative to the I-beam 10 to engage the flanges 14, 16, respectively of the I-beam 10. In the shown preferred embodiment, clamping mechanism 52 remains stationary while clamping mechanism 54 is moveable with respect to clamping mechanism 52. In some embodiments, the clamping mechanism 52 is generally fixed in position but is capable of moving out of the way for the material to pass, but when engaged returns to the same fixed position. The fixed position relates a known reference plane (the datum line) to the controller 80.

The clamping mechanisms 52 and 54 may each include a side clamping member 51, 53, respectively, and first and second clamping members 55A, 56A and 55B, 56B, respectively. One or more of the first and second clamping members 55A, 56A and 55B, 56B may be capable of movement along their respective side clamping members 51, 53 to hold flanges 14, 16 of the I-beam 10 therein. The first clamping members 55A, 56A are usable to hold the material in place (e.g., hold the material down) while drilling, while the second clamping members 55B, 56B are utilized to prevent the material from being pushed down by the web drilling member 46. In one embodiment, first clamping members 55A, 56A are moveable upward and downward along their respective side clamping members 51, 53 and move downward along their respective clamping members 51, 53 to engage the material/beam flanges 14, 16 within the clamping members 55A, 55B and 56A, 56B. In this embodiment, the second clamping member 55B moves downward when the material/beam 10 moves and always returns to a location at or near the top of the conveying mechanism (e.g., conveyor) when the clamping mechanism 52 is engaged, while the second clamping member 56B always remains at or near the top of the conveying mechanism 45 during the operation and merely translates with the entire clamping mechanism 54, e.g. when the entire clamping mechanism 54 moves towards and away from the material/beam 10 so that it is always known where the top of the conveyor is with respect to the tool on the flange drills. The clamping mechanisms 52 and 54 may possess measuring ability with respect to the parameters (e.g., reference material/beam width) of the I-beam 10.

The operation of the drilling apparatus 20 is illustrated in FIGS. 3-6. An I-beam 10 is disposed within the operating space 24 and positioned for performing the operation on the material (e.g., for placing hole(s) through the I-beam 10 and/or for measuring the I-beam 10). In one embodiment, a conveying apparatus such as a conveyor (not shown) may be utilized to transport the I-beam 10 from a first location to a location within the operating space 24, also preferably on the conveyor. It is also contemplated by the inventor that, in lieu of the conveyor, the I-beam 10 may be disposed within the operating space 24 by any other manual or electronic means for placing an object in an operating space or for moving a material from a first position to a second position that is known to those skilled in the art.

Once the I-beam 10 is disposed in the desired location within the operating space 24, the clamping mechanisms 52 and 54 are employed to measure the I-beam 10 and for holding the material upon the eventual forming of the hole(s) in the I-beam 10, and to aid in determining parameters of the subject I-beam 10 such as reference material width or reference beam width (via the datum line provided by the clamping mechanism 52 and the measurement of position of the clamping mechanism 54 upon its contact with the material). In a preferred embodiment, the material/beam 10 after being moved into position rests on the conveyor (e.g., the roller conveyors). To grippingly engage the I-beam 10, one or more of the clamping mechanisms 52, 54 may be moved in the x direction and/or y direction as needed (the clamping mechanisms 52 and 54 may also optionally be configured to move in the z direction). In one embodiment, only one of the clamping mechanisms 52, 54 is moveable along the x-axis (or at least is moved along the x-axis, regardless of whether they are both capable of x-axis movement). In the embodiment shown in FIGS. 2-6, the clamping mechanism 54 is moveable and has I-beam measuring ability, while the clamping mechanism 52 is moveable but generally remains stationary along the x-axis as a reference point (datum line) for the measurement and clamping of the I-beam (the clamping mechanism 52 may be moveable to allow the material/beam to pass through but return to its fixed position to provide a reference point after the material/beam passes therethrough). One or more of the clamping mechanisms 52, 54 may be manipulated to move along the x-axis towards and away from the I-beam 10 (but may also in some embodiments be moved along the y-axis and/or z-axis), with the shown embodiment employing movement of the clamping mechanism 54 towards and away from the generally stationary clamping mechanism 52, and the first clamping members 55A, 56A and the second clamping members 55B, 56B may be moved towards and away from one another along their respective side clamping members 51 and 53 (which may be along the y-axis or a combination of the x-axis, y-axis, and/or z-axis) to hold the material therein.

Figure 3:
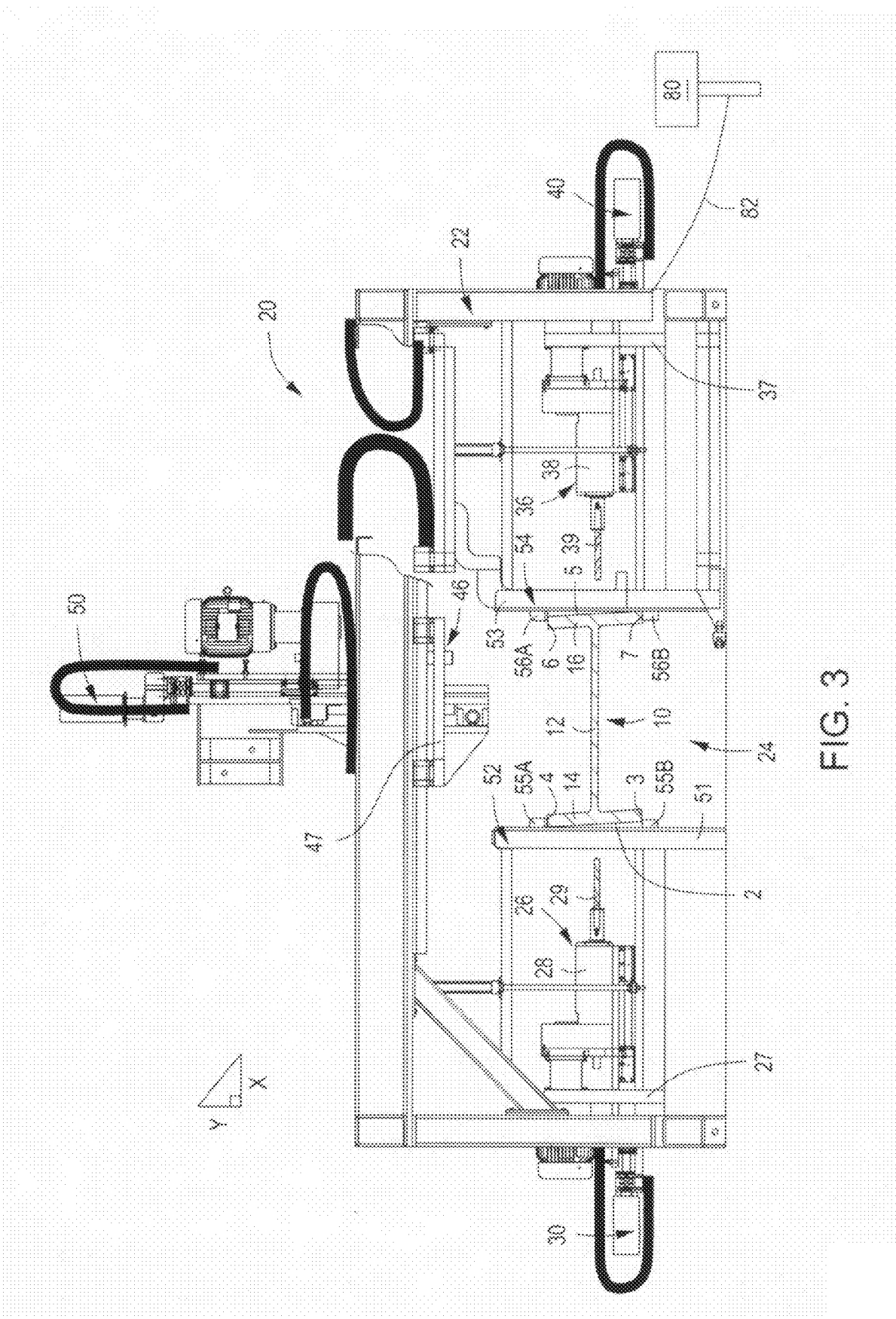
FIG. 3 is a sectional view of a drilling apparatus with an I-beam located therein, drilling members of the drilling apparatus are disposed in a first location.

In the example embodiment shown in FIG. 3, the side clamping member 51 engages and supports at least a portion of an outer surface 2 of the first flange 14 of the I-beam 10, while the first clamping member 55A and second clamping member 55B, which may each be slidable along the side clamping member 51, grippingly engage and support at least portions of side surfaces 4 and 3, respectively, of the first flange 14. Likewise, in the depicted embodiment, the side clamping member 53 engages and supports at least a portion of an outer surface 5 of the second flange 16 of the I-beam 10, while the first clamping member 56A and second clamping member 56B, which each may be slidable along the side clamping member 53, grippingly engage and support at least portions of side surfaces 6 and 7, respectively, of the second flange 16. By cooperation of the various parts of the clamping mechanisms 52, 54 described above, the I-beam 10 is held in the desired location for drilling one or more holes in the I-beam 10 using the drilling apparatus 20.

In one embodiment, the gripping engagement of the I-beam 10 in the drilling apparatus 20 is accomplished when, after the I-beam 10 is disposed in the correct location within the drilling apparatus 20, the clamping mechanism 54 moves toward the I-beam 10 until it contacts the I-beam 10. When the clamping mechanism 54 moves inward toward the I-beam 10, it presses (preferably tightly presses) the material/beam 10 against the clamping member 51. When the clamping mechanism 54 contacts the material/beam may be sensed in some manner. The side clamping member 53 may include a measuring device that communicates where the clamping member 53 is located with respect to the datum line (at the fixed position of the clamping member 51). Because the movement of the side clamping member 53 is monitored by a counting system or some other position monitoring device and counter, its location is known when it contacts the material/beam 10. When to stop the side clamping member 53 from its movement toward the material/beam 10 may be known by looking at a pressure switch and/or by watching the counter system to determine when the side clamping member 53 halts movement. In some embodiments, the controller 80 knows that the clamping mechanism 54 has contacted the I-beam 10 by monitoring the encoder 40 counts of the side clamping member 53.

After the side clamping members 51, 53 hold the I-beam 10 therein and movement of the side clamping member(s) is halted, one or more of the first clamping members 55A, 56A and/or one or more of the second clamping members 55B, 56B translate along the side clamping members 51, 53 until they contact and engage the I-beam 10 therein. In the shown embodiment in FIGS. 2-6, only the first clamping members 55A and 56A are moveable along the side clamping members 51 and 53, respectively, to grippingly engage the I-beam 10, while the second clamping members 55B, 56B remain stationary. However, it is within the scope of embodiments that the second clamping members 55B, 56B may also be moveable along the side clamping members 51, 53.

Nonetheless, after the movement of the clamping member(s) 51, 53 ceases, the first clamping members 55A and 56A may translate (preferably moving downward) along their respective side clamping members 51, 53 until they are in contact with the I-beam 10. The controller 80 knows when the first clamping members 55A and 56A contact the I-beam 10 (when the first clamping members 55A and 56A are down) by monitoring a pressure switch (not shown) or by any other means for determining contact with a material known to those skilled in the art.

When the I-beam 10 is clamped (when movement of the clamping mechanism 54 ends), the controller 80 communicates with the clamp encoder, preferably by taking a reading from the clamp encoder, to determine a reference I-beam width. The reference I-beam width is not the true material width because of the possible I-beam skew or offset. For example, referring to FIG. 2, the first flange 14 in the I-beam 10 shown possesses a skew 8 from reference I-beam width, and the second flange 16 possesses a skew 9 from reference I-beam width. Other types of skew are illustrated in FIGS. 1B-1E.

The moving parts of the clamping mechanisms 52, 54 may be manipulated using any means known to those skilled in the art, including mechanical or electrical means, and the clamping mechanisms 52, 54 may optionally be translated using the controller 80.

As mentioned above, in a preferred embodiment, the second clamping mechanism 55B moves downward when the beam/material 10 moves and always returns to the top of the conveyor when the clamping mechanism 52 is engaged, and the clamping mechanism 56B remains fixed at the top of the conveyor and only moves inward and outward (towards and away from the material/beam 10) with the entire clamping mechanism 54. Also in this embodiment, the side clamping member 53 is moveable and the side clamping member 51 is generally fixed and returns to this same fixed position when engaged but moveable to allow passage of the beam/material 10. The known parameters in this embodiment are the following: the location of the top of the conveyor is known (and fixed) with respect to the tool on the flange drills, the second clamping mechanism 55B is always located at the top of the conveyor and fixed when engaged, the second clamping mechanism 56B is always located at the top of the conveyor (although it may move inward and outward with the entire clamping mechanism 54, its y-axis position remains fixed), the theoretical material size is known from a database, the measured material size is known by the measuring ability of the clamping mechanisms 52, 54, and the location of the side clamping member 53 (moveable) with respect to the side clamping member 51 (moveable, but always fixed in a known position when engaged) is known.

By using these known parameters when the material/beam 10 is completely clamped, whether the first flange 14 is straight up and down or whether it is leaning in a direction as well the direction in which the first flange 14 is leaning is known. Either the upper end 4 of the first flange 14 is in contact with the side clamping member 51 and/or the first clamping mechanism 55A (e.g., at the corner), the lower end 3 of the first flange 14 is in contact with the side clamping member 51 and/or the second clamping mechanism 55B (e.g., at the corner), or both the upper and lower ends 4, 3 of the first flange 14 are in contact with the side clamping member 51, first clamping mechanism 55A, and/or second clamping mechanism 55B. See the description below of the overall process for more description of how the clamping system is configured and operates to provide reference measurements of the beam/material.

In any event, as described below, the drilling members 26, 36 are used to probe the beam/material 10 at locations and determine the slope of the material/beam 10 with respect to an ideal material/beam (and determine whether a slope even exists). If any slope of material/beam 10 is determined to exist in the subject material/beam 10, the direction in which the first flange 14 is sloped/leaning may be determined, and the distance from the clamping mechanism 52 to the center of the beam/material may be projected. This same analysis may be performed on the second flange 16.

Once the clamping mechanisms 52, 54 engage the I-beam 10 in a location within the drilling apparatus 20, one or more of the drill frames 27, 37, 47 may use at least a portion of the drilling members 26, 36, 46 operatively connected thereto and their position monitoring devices and counting mechanisms to find locations, preferably at least two locations, on each of the outer surfaces 2, 5 of the flanges 14, 16 of the I-beam 10, as illustrated in FIGS. 3-6. Using the portion(s) of one or more of the drilling members 26, 36, 46 (probing of the flanges 14, 16) and their position monitoring devices and counting mechanisms to find the locations on the flanges 14, 16 allows the determination of the skew, deviation, or offset of the I-beam 10 from the reference material width without the need to know the length(s) of the drill bits 29, 39, 49. Determining the skew, offset, or deviation is accomplished using the position monitoring devices and counting mechanisms, e.g., one or more of the servo motors and/or servo drives with encoders 30, 40, 50, where the counting mechanisms communicate position to the controller 80 so that it may determine the material skew, offset, or deviation in shape from the ideal I-beam configuration.

The ability to determine skew or offset of the beam or other material without the need to know the drill bit length is extremely advantageous for several reasons. First, when a drill bit is used to drill multiple holes in a beam or other material, it often becomes more "dull" and is thus of a different length than the original or sharpened bit. If the "dull" drill bit is sharpened, the bit length is also changed. Second, if the drill bit is changed, the length of the drill bit may vary. The variations in the lengths of the drill bit(s), if measuring depends upon the drill bit length, would require the timeconsuming process of measuring the drill bit length prior to every drilling of a hole in the material(s). Therefore, obviating the need to measure the drill bit length prior to drilling every hole in the material saves valuable operating time (and thus operating cost) and improves overall production output of properly drilled materials.

Referring now to FIG. 3, the controller 80 communicates with one or more of the drill frames 27, 37 to translate one or more of the drilling members 26, 36 along the y-axis (optionally and/or x-axis and/or z-axis). The drill frames 27, 37 translate the drilling members 26, 36 to move the drill bits 29, 39 to first locations adjacent to the flanges 14, 16, respectively, of the I-beam 10. The first locations may be the centers or approximately the centers of the outer surfaces 2, 5 of the flanges 14, 16, as shown in FIG. 3. (Although the drilling members 26, 36 may probe any location on their respective flanges 14, 16, a position reading may be taken at or near the center of each web 12 because it is very probable that no hole already exists at the center.)

The drill frames 27 and 37 are preferably capable of movement independent from one another and need not take measurements of their respective flanges 14, 16 at the same time.

Figure 4:
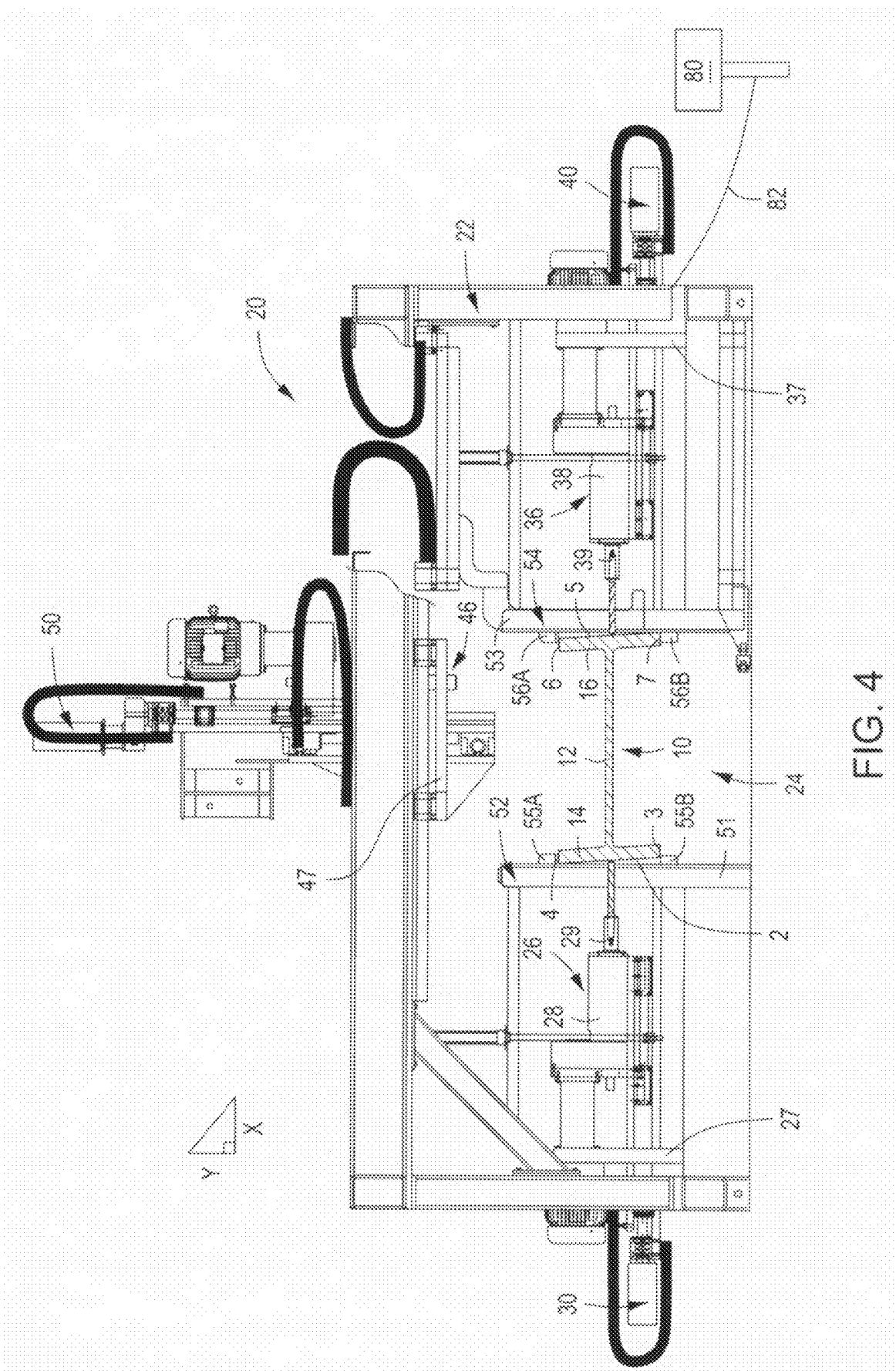
FIG. 4 is a sectional view of the drilling apparatus and I-beam of FIG. 3, where at portion of the drilling members is in contact with a first portion of the I-beam.
Figure 5:
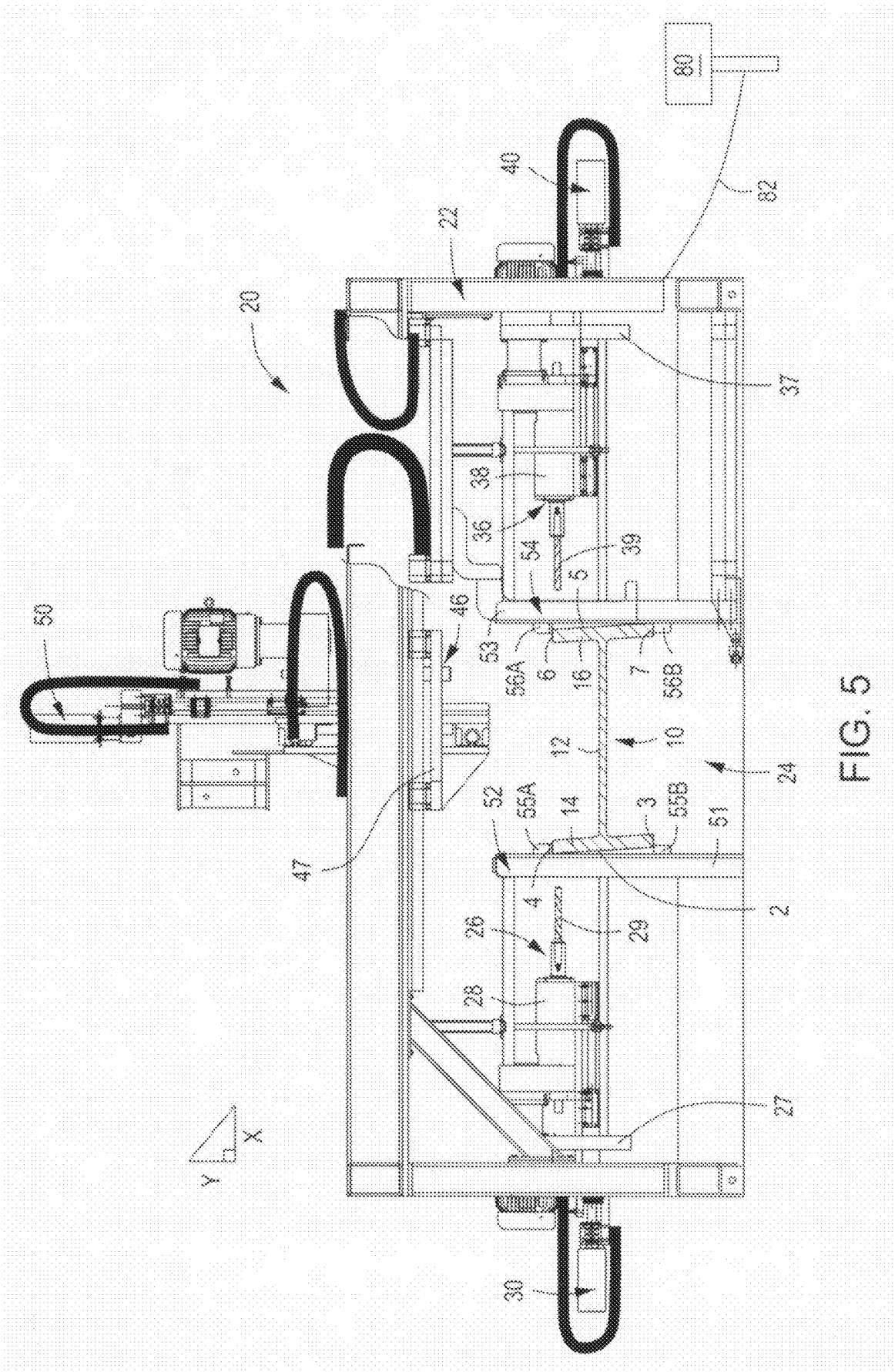
FIG. 5 is a sectional view of the drilling apparatus and I-beam of FIG. 3, where the drilling members are disposed in a second location.

When the drill bits 29, 39 are disposed in the first locations relative to the I-beam flanges 14, 16, one or more of the drill frames 27, 37 are translated to move the drilling members 30, 40 along the x-axis (optionally and/or y-axis and/or z-axis), which may be towards the I-beam 10, until at least portions of the drill bits 29, 39 contact the I-beam 10 at the first locations on the I-beams 10, preferably at or near the center of the flanges 14, 16, as shown in FIG. 4. The position monitoring devices with drive mechanisms and counting mechanisms communicate to the controller 80, for example encoder counts from the servo motors are run through a series of algorithms in the controller 80, so that the controller 80 knows when one or more of the drill bits 29, 39 contact the I-beam 10. When one or more of the drill bits 29, 39 contacts the I-beam 10, the controller 80 takes a first position reading (position of the drilling members 26, 36 upon their contact with the flanges 14, 16) from the counter that accumulates pulses from the encoder. This value is stored in the controller 80 until the next position is determined (see below).

After the first position reading is taken from the encoder, the drill frames 27, 37 are retracted along the x-axis (and optionally moved along the y-axis) relative to their first position shown in FIG. 4. In one embodiment, the one or more drill frames 27, 37 may be retracted to their position shown in FIG. 3, and one or more of the drill frames 27, 37 may simultaneously or thereafter be translated along the y-axis to move the drilling members to a second location adjacent to the I-beam 10. In one embodiment shown in FIG. 5, both drill frames 27, 37 are moved upward so that the drill bits 27, 37 are disposed at or near a second location approximately across from the upper ends 4, 6 of the flanges 14, 16.

Figure 6:
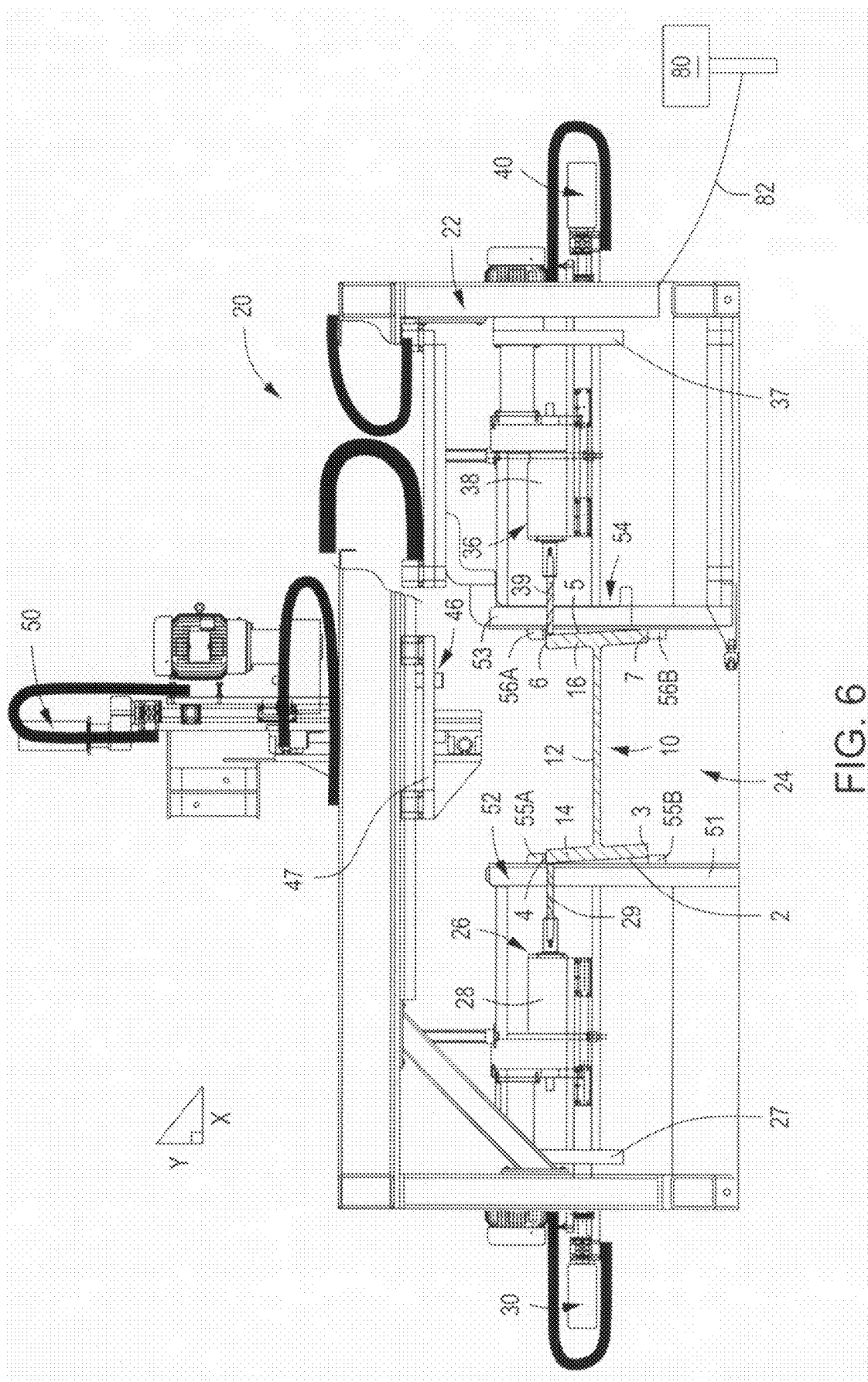
FIG. 6 is a sectional view of the drilling apparatus and I-beam of FIG. 3, where at least a portion of the drilling members is in contact with a second portion of the I-beam.

When the drill frames 27, 37 are positioned at second locations across from the flanges 14, 16, the drill frames 27, 37 (and drilling members 26, 36) are then translated along the x-axis (and also may be translated along the y-axis if desired) until the drill bits 29, 39 again contact the I-beam 10, this time at second locations on the I-beam 10 (which may be, as shown in FIG. 6, at outer surfaces 2, 5 of the flanges 14, 16 at or near the top surfaces 4, 6 of the flanges 14, 16), as illustrated in FIG. 6. Second position readings of the drilling members 26, 36 upon contact of their drill bits 29, 39 with their respective flanges 14, 16 are taken by the controller 80 from the counters which accumulate pulses from the position monitoring devices (which may be servo drives, resolvers, and/or encoders) as depicted in FIG. 6. The controller 80 then uses the data gathered from each position reading and calculates true or actual I-beam dimensions (e.g., width) (or true or actual material dimensions for materials other than I-beams) as well as the distances of the centers of the flanges 14, 16 from the surfaces of the side clamping members 51, 53 which are adjacent to the flange outer surfaces 2, 5 (see detailed equations below). The controller processes a calculation according to the following general formula:

depth=clamped depth−first flange skew−second flange skew where clamped depth is determined by the clamping members/mechanisms and the first and second flange skews are determined by the drilling member position readings. The first flange skew 8 and second flange skew 9 are illustrated in FIG. 2. The controller 80 then provides this information to the drilling apparatus so that it may move the drilling member 46 to the correct location for the web holes to be drilled based upon the material width and skew or offset.

The probing of the first flange 14 and the second flange 16 may be accomplished with their respective drilling members 26 and 36 independently of each other.

The process and accompanying calculations may be described as follows. As described above, clamping mechanism 52 constitutes the datum line, and the material/beam is preferably disposed against the datum line for its measuring. The side clamping member 53 moves in and out and possesses measuring ability, so that when the side clamping member 53 contacts the material/beam may be determined in some way, such as via a time delay long enough to assume that the side clamping member 53 has contacted the material/beam.

The flange drilling members 26, 36 preferably include the ability to probe their respective flanges with their drill bits 29, 39 in two separate locations and determine the distance of the web 12 from the clamping mechanisms 52, 54 using the information gathered from this probing process without the need to know the drill bit lengths. The flange drill frames 27, 37 have the ability to measure to determine this distance using merely information attained from this drilling members 26, 36 probing process.

The clamping mechanisms 52, 54 are used to hold the material while drilling. As mentioned above, the clamping mechanism 52 (e.g., the top flange clamp) may serve as the datum line, while the clamping mechanism 54 (with side clamping member 53) is used to hold the material against this datum line. (The first clamping members 55A and 56A may be utilized to hold the material/beam in place (e.g., hold the material/beam down) while drilling the one or more holes in the material/beam, while the clamps 55B and 56B may be used to prevent the material/beam from being pushed down by the web drilling member 46.)

The side clamping member 53 (or clamping mechanism 54) may possess one or more measuring devices that communicate where it is located with respect to the datum line. As mentioned above, the clamping mechanism 54 is moveable towards and away from the datum line. When the side clamping member 53 (or clamping mechanism 54) contacts the material/beam in some manner may be sensed via the one or more measuring devices possessed by the clamping mechanism 54.

The flange drilling members 26, 36 are capable of feeding towards and away from the material/beam. The counting device(s) in or on the drilling members 26, 36 communicate where the drill frames 27, 37 are located during feeding relative to the datum line. When the drill bits 29, 39 contact the material/beam is known by monitoring the counts during the feeding process. Each counting device may include any counting device which is known to those skilled in the art which uses counting to determine position.

When movement of the material is stopped in the machine, the clamping mechanism 54 (e.g., the bottom flange clamp) may be translated towards the material. An actual material depth is known when the clamping mechanism 54 movement ends; however, this actual material depth is not necessarily the depth at the web 12 of the material. What is needed to correctly drill the hole(s) (or to correctly cut the flanges or other portions of the material in the embodiments with a cutting machine) is the material depth at the web 12 of the material.

Also needed to correctly drill the hole(s) (or to correctly cut the flanges) is the distance of the web 12 from the clamping mechanism 52 and the clamping mechanism 54. To determine the distance of the web 12 from the clamping mechanism 52 and from the clamping mechanism 54, the flange drilling members 26, 36 may be used to probe two points (or more) on their respective flanges 14, 16, as described above. Because the lengths of the drill bits 29, 39 may not be known, where the tips of the drill bits 29, 39 are located with respect to the datum line or the drill frames 27, 37 is not known. Therefore, when probing each flange of the material, the known parameters are the x location of the first probe of the material flange and the x location of the second probe of the material flange relative to each other (and not relative to the datum line). For example, upon probing the two locations on the first flange 14 using the drilling member 26, the x location of the first probe of the first flange 14 and the x location of the second probe of the first flange 14 becomes known. Consequently, as a reference location, it may be assumed that one of the x probes is 0 and the other is +/some number from 0 depending on the probe x reading. This probing of the two points provides two points on a straight line. This straight line may be sloped with respect to a vertical line. By knowing the two points on a line, the equation y=mx+b (where m is the slope, b is the line's y-intercept, and x and y are the coordinates of a single point on the line) may be employed to determine where the web of the material is located along the x axis.

For illustrative purposes, an example reading of the top probe and bottom probe of one of the flanges 14, 16 using one of the drilling members 26, 36 provides the following coordinates (coordinates are represented by top probe $(x_2, y_2)$ and bottom probe $(x_1, y_1)$): top probe (0, 8) and bottom probe (−1, 1). Whatever the x reading is does not really matter, as the first x and second x are just relative to each other.

Slope may be determined by employing the following equation:

$$\text{slope} = m = \frac{y_2 - y_1}{x_2 - x_1},$$

where $(x_1, y_1)$ are the coordinates of the line at a first point on the line (and the first probe reading coordinates) and $(x_2, y_2)$ are coordinates of the line at a second, different point on the line (and the second probe reading coordinates). Therefore, using the example coordinates of the top probe and bottom probe provided above to determine the slope, slope=m=(8−1)/(0−(−1))=7/1=7. Inputting this calculated slope and one of the probed coordinate values (here the coordinates of the top probe (0, 8) into the y=mx+b equation and solving for b is represented by the following calculation:

$8=(7*0)+b$ $b=8.$

The next step involves determining the x location of the web, i.e. in this example by assuming that the web is located at y=1+((8−1)/2)=4.5. Entering this y coordinate into the y=mx+b equation as follows, using the previously calculated slope (m) and y-intercept (b) values in the equation and solving for x, produces the x distance of the pertinent edge of the web from the particular inward-facing surface of the pertinent side clamping member:

$4.5=7*x+8$ $x=-3.5/7$ $x=-0.5.$

Because the web 12 can never be located past the side clamping member (the web 12 is always inside the envelope), this number is made positive; therefore in this example, the web is located x=0.5 away from its side clamping member. The above calculations are performed on each flange 14, 16 with the probe readings of the drilling members 26, 36, respectively.

Therefore, the first flange x offset from the side clamping member 51 (e.g., top flange x offset) (also referred to as "TFXOffset") is calculated as explained above from the probing of the first flange 14 using the drilling member 26, and the second flange x offset from the side clamping member 53 (e.g., the bottom flange x offset) (also referred to as "BFXOffset") is calculated as explained above from the probing of the second flange 16 using the drilling member 36. Moreover, the web depth reading (also referred to as "WebDepthReading"), which was taken when the side clamping mechanism 54 (e.g., the bottom flange clamp or second flange clamp) contacted the material, is also now a known value. These calculated and measured values are then entered into the following equation to determine the true depth of the material:

TrueD=WebDepthReading−TFXOffset−BFXOffset.

Using the calculated and measured values, the following three equations may be used to calculate X, the x position for the hole on the web, for each of the following situations:
Situation 1: All holes which should be formed in the web at an accurate distance from the first flange 14 (e.g., top flange):

$X$=TFXOffset+DistanceFromTF, where DistanceFromTF is the desired distance of the hole(s) from the first flange 14 or top flange.
Situation 2: All holes which should be formed in the web at an accurate distance from the second flange 16 (e.g., bottom flange):

$X$=TFXOffset+TrueD−DistanceFromBF, where DistanceFromBF is the desired distance of the hole(s) from the second flange 16 or the top flange.
Situation 3: All holes which should be formed in the web at an accurate distance from the center of the material or at an accurate center of the material:

$X$=TFXOffset+(TrueD/2+DistanceFromCenter), where DistanceFromCenter is the desired distance of the hole(s) from the center of the material.

Note that the above calculations may be reduced to computer language or code (e.g., via computer software, any other external computer device, and/or hardware). The above calculations and equations are merely included for illustrative purposes and to aid in understanding of the invention.

In embodiments described above, the drill frames 27, 37 utilize the drilling members 26, 36 to find one or more locations, preferably two locations, on the surfaces 2, 5 of each of the flanges 14, 16 and determine the skew, offset, or variation in shape or configuration of the I-beam 10 or other subject material without the need to know the drill bit 29, 39 length. This determination of the skew, offset, or variation in shape or configuration is accomplished via use of the position monitoring devices with drive mechanisms and counting mechanisms, which may be servo motors and/or servo drives with encoders, as the counting mechanisms communicate position to the controller 80 which determines the material skew, offset, or variation in shape or configuration. Finally, the drilling member 46 may be translated into the proper calculated and measured position for drilling web holes and may drill the specified holes in the web 12. Likewise, the drilling members 26, 36 may be used to drill holes in the proper locations on the flanges 14, 16, which proper locations may be calculated and measured in a similar manner as described above in relation to the web holes or by other methods and apparatus.

Figure 7:
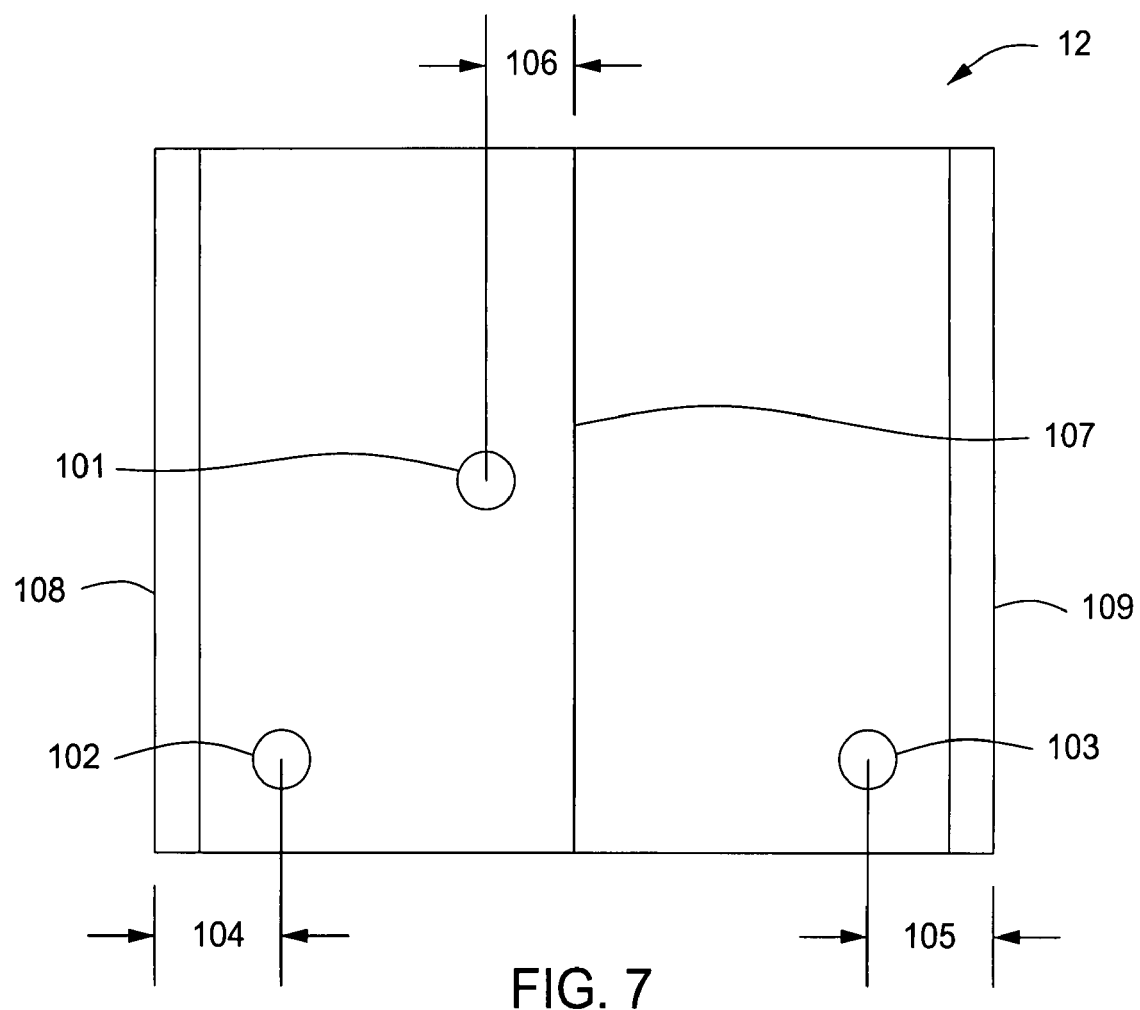
FIG. 7 is a downward view of exemplary holes drilled in a web of an I-beam.

FIG. 7 shows holes produced in the web 12 of a beam 10 according to embodiments described herein (but it is understood that holes may be produced in any material and in any location on a beam using the embodiments described above). A center of first web hole 102 is disposed on the web 12 a critical distance 104 from the top flange 14, while a center of second web hole 103 is disposed on the web 12 a critical distance 105 from the bottom flange 16. Likewise, a center of third web hole 101 is disposed on the web 12 a critical distance 106 from web center 107. The correct distances 104, 105, and 106 and hole locations on the web 12, even of the skewed, offset, or shape-varied beams, are determined using the methods and apparatus of embodiments of the drilling apparatus 20 described above and the desired distance of the holes from web center and/or from the first flange 14 and/or second flange 16.

If desired, the above process may be repeated with one or more additional I-beams. An advantage of the above drilling apparatus and method is that even though the additional I-beams may not be shaped in the same way as the previous I-beam and may be offset or skewed in relation to an ideal I-beam, the drilling apparatus 20 is capable of quickly, efficiently, and accurately measuring, determining, and optionally drilling the correct hole locations without the need for measuring equipment external to the clamping mechanisms 52, 54 and drilling members 26, 36 (and possibly 46) and without the need to obtain additional parameters such as the drill bit length.

Although the above-described embodiments involve measuring at two locations using the drilling members 26, 36, it is within the scope of embodiments that only one location or multiple locations on the I-beam may be measured. Similarly, any locations on the I-beam may be contacted by the drill bits 29, 39 for position readings, as embodiments are not limited to measuring the shown locations. Furthermore, in alternate embodiments other portions of the drilling members 26, 36 or drill frames 27, 37 may be used to contact the I-beam in lieu of or in addition to the drill bits 29, 39.

The above-described embodiments constitute a system based around a drill. However, it is also contemplated by the inventor that alternate embodiments may include a torch system or plasma cutting system in lieu of the drill system. Instead of drills, any cutting tools, cutting system, or other hole-forming system known to those skilled in the art which is capable of forming one or more holes in a beam/material may be used in embodiments.

In some embodiments, the drilling apparatus is instead a cutting apparatus or machine having one or more plasma torches or oxy torches to cut a portion of the beam, for example to cut one or more flanges of the beam(s). The cutting apparatus or machine of embodiments includes many of the same elements of the drilling apparatus described above, except that the drilling tools are replaced with plasma torches or oxy torches or other cutting tools.

In some embodiments, a cutting apparatus and drilling apparatus as described above may be utilized in conjunction with one another, as a combined apparatus or one apparatus after another.

Although in the above-described embodiments the web drilling member 46 is merely used to form holes in the web 12, the web drilling member 46 may also be used to probe the web 12 if desired for measurement purposes. Ordinarily, two or more probing members (not shown) are included with the drilling apparatus (or cutting apparatus) below the I-beam location between clamps to obtain web measurements using one or more probing members (preferably using two probing members simultaneously) rather than requiring the web drilling member 46 to obtain measurements of two locations on the web separately.

In alternate embodiments, the clamping mechanism 24 contacting the material may be accomplished in many different ways for contacting and measuring the contact point which are known to those skilled in the art, and the clamping mechanism 24 moving inward and outward relative to the material may be accomplished in many different ways as known to those skilled in the art for moving a drilling member. Furthermore, when the drill bit contacts the material may be determined in many other ways, including but not limited to using different digital filters, electrical contacts, limit switches, and/or any other contact-determining means known to those skilled in the art.

While the foregoing is directed to embodiments of the present invention, other and further embodiments of the invention may be devised without departing from the basic scope thereof, and the scope thereof is determined by the claims that follow.

The invention claimed is:

1. A drilling apparatus capable of drilling one or more holes in a beam, comprising:
   one or more clamping mechanisms capable of clamping the beam therein to determine reference material dimensions;
   one or more drilling members for providing one or more position readings on the beam for use in determining beam skew relative to the reference material dimensions, the one or more drilling members capable of translating relative to the beam; and
   a controller operatively connected to the one or more clamping mechanisms and the one or more drilling members,
   wherein the one or more position readings of the one or more drilling members are communicated to the controller upon contact of the one or more drilling members with the beam and the controller uses these one or more position readings to calculate actual material dimensions including beam skew.

2. The drilling apparatus of claim 1, further comprising one or more linear force devices operatively connected to the one or more drilling members, the one or more devices capable of providing generally linear force to move the one or more drilling members towards and away from the beam.

3. The drilling apparatus of claim 2, wherein the one or more linear force devices comprise one or more servo motors operatively connected to lead screws, hydraulics comprising one or more hydraulic piston and cylinder arrangements, or one or more hydraulic motors.

4. The drilling apparatus of claim 2, further comprising one or more position monitoring mechanisms operatively connected to the one or more drilling members, the controller capable of determining position of the one or more drilling members upon their contact with the beam via output from the one or more position monitoring mechanisms.

5. The drilling apparatus of claim 4, wherein the one or more position monitoring mechanisms comprise one or more of the following: servo drives, encoders, resolvers, or hall effect devices.

6. The drilling apparatus of claim 4, wherein the controller is capable of determining material skew via the reference material dimensions obtained with one or more the clamping mechanisms and drilling member position readings obtained with the position monitoring mechanisms and one or more counting mechanisms, the counting mechanisms capable of accumulating pulses from the one or more position monitoring mechanisms to relay the position readings to the controller.

7. The drilling apparatus of claim 6, wherein each drilling member comprises:
one or more drill frames capable of translating a position of the drilling apparatus relative to the beam; and
one or more drill bits for drilling one or more holes in the beam at one or more locations, wherein the controller is capable of translating the one or more drill frames relative to the beam.

8. The drilling apparatus of claim 7, wherein the drilling apparatus is capable of determining material skew without knowing lengths of the one or more drill bits.

9. The drilling apparatus of claim 1, wherein:
the drilling apparatus is capable of forming one or more holes in a web of the beam,
the beam is an I-beam comprising first and second flanges operatively connected to each end of the web; and
beam skew is the position of first and second flanges of the I-beam relative to the web.

10. The drilling apparatus of claim 1, wherein the drilling members comprise a first drilling member and a second drilling member, the first drilling member operatively connected to a first position monitoring mechanism and a first counting mechanism capable of reading a position of the first drilling member upon its contact with a first flange of the beam and the second drilling member operatively connected to a second position monitoring mechanism and a second counting mechanism capable of reading a position of the second drilling member upon its contact with a second flange of the beam.

11. The drilling apparatus of claim 1, wherein at least one of the clamping mechanisms is capable of translation towards and away from the beam to clamp the beam therein and determine the reference material dimensions upon contact with the beam.

12. A method of determining proper positioning for one or more holes in a beam, comprising:
providing a drilling apparatus comprising one or more clamping mechanisms and one or more drilling members capable of operable communication with a controller;
clamping the beam within the one or more clamping mechanisms;
determining reference material dimensions of the beam using the one or more clamping mechanisms and the controller;
using the drilling members to make one or more position readings of the drilling members upon their contact with the beam without needing to know length of the drilling members;
communicating the one or more position readings and the reference material dimensions to the controller; and
calculating actual material dimensions and material skew using the one or more position readings and the reference material dimensions.

13. The method of claim 12, further comprising drilling one or more holes in a web of the beam at one or more locations in reference to the calculated actual material dimensions.

14. The method of claim 13, wherein the one or more drilling members comprise at least one drilling bit operatively connect to at least one drill frame, and wherein using the drilling members to make one or more position readings on the beam comprises moving the at least one drill frame to place the at least one drilling bit in contact with at least two contact locations on the beam to make at least two position readings of the one or more drilling members at the contact locations.

15. The method of claim 14, wherein one or more position monitoring mechanisms and one or more counting mechanisms are operatively connected to the one or more drilling members and to the controller, and wherein the one or more counting mechanisms relay drilling member position from the one or more position monitoring mechanisms to the controller to determine material skew of the beam without knowing length of the at least one drilling bit.

16. The method of claim 13, wherein the one or more position readings are obtained by placing the one or more drilling members in contact with one or more flanges of the beam in at least two locations on the one or more flanges and communicating the position readings to a controller via one or more counting mechanisms operatively connected to one or more position monitoring mechanisms.

17. The method of claim 16, wherein the one or more position monitoring mechanisms comprise one or more encoders, one or more resolvers, or one or more hall effect devices.

18. The method of claim 12, wherein using the drilling members to make one or more position readings on the beam comprises:
moving the one or more drilling members into contact with the beam using the controller; and
taking one or more position readings with the controller using one or more position reading devices.

19. A drilling apparatus for drilling one or more holes in a web of an I-beam, comprising:
one or more clamping mechanisms capable of clamping the I-beam therein to determine reference beam dimensions;
a first drilling member for contacting a first flange of the I-beam in at least two locations;
a second drilling member contacting a second flange of the I-beam in at least two locations;
one or more servo motors and one or more encoders, resolvers, or hall effect devices operatively connected to each drilling member for providing position readings at the locations where the drilling members contact the first and second flanges to determine beam skew; and
one or more counting mechanisms operatively connected to the one or more encoders, resolvers, or hall effect devices for relaying position readings to a controller, the controller capable of receiving position readings data and calculating true beam dimensions and a distance from a center of each flange from a side clamp surface.

* * * * *